Dec. 8, 1964 L. R. ADAMS 3,160,862
RING CIRCUIT
Filed Jan. 30, 1961 2 Sheets-Sheet 1

INVENTOR
LESTER R. ADAMS
BY Leo J. Aubel
ATTORNEY

Dec. 8, 1964 L. R. ADAMS 3,160,862

RING CIRCUIT

Filed Jan. 30, 1961 2 Sheets-Sheet 2

3,160,862
Patented Dec. 8, 1964

3,160,862

RING CIRCUIT

Lester R. Adams, Endwell, N.Y., assignor to International Business Machines Corporation, New York, N.Y., a corporation of New York Filed Jan. 30, 1961, Ser. No. 85,806
5 Claims. (Cl. 340—174)

This invention relates to timing ring circuits and more particularly to a timing ring circuit comprising magnetic core elements.

Timing ring circuits have a variety of applications in computers and other related fields. In such circuits, it is desirable to form timing pulses adjacent to one another with as little delay as possible between pulses. Timing rings utilizing magnetic cores have a fewer number of active components than vacuum tube or transistor rings and thus are more reliable. Also, magnetic core rings offer space savings and, otherwise, are more economical than vacuum tube or transistor rings.

Accordingly, it is a principal object of the present invention to provide an improved ring circuit utilizing magnetic cores.

In ring circuits, it is also desirable to provide pulses which may be of varying lengths and may be generated at determined time intervals.

Accordingly, it is another object of the present invention to provide a timing ring wherein the output pulse length and/or occurrence of the timing pulses may be varied.

In the attainment of the foregoing objects, two similar and interconnected registers are provided; each register comprises a plurality of cores connected in series. A storage means in the form of a capacitor is utilized to temporarily store the output of each core; the output of each capacitor is connected as the input to the succeeding core. The discharging of the capacitor in one register is controlled by the shifting of the magnetic state of a core in the other register. As a consequence, the discharging of a capacitor causes a succeeding core in the same register to shift its magnetic state; shift pulses applied during the following timing period cause said succeeding core to shift and cause its associated capacitor to charge. The cycle is then repeated. The timing ring thus provides a series of pulses which occur immediately one after the other.

The foregoing and other objects, features and advantages of the invention will be apparent from the following more particular description of a preferred embodiment of the invention, as illustrated in the accompanying drawings.

Figure 1:
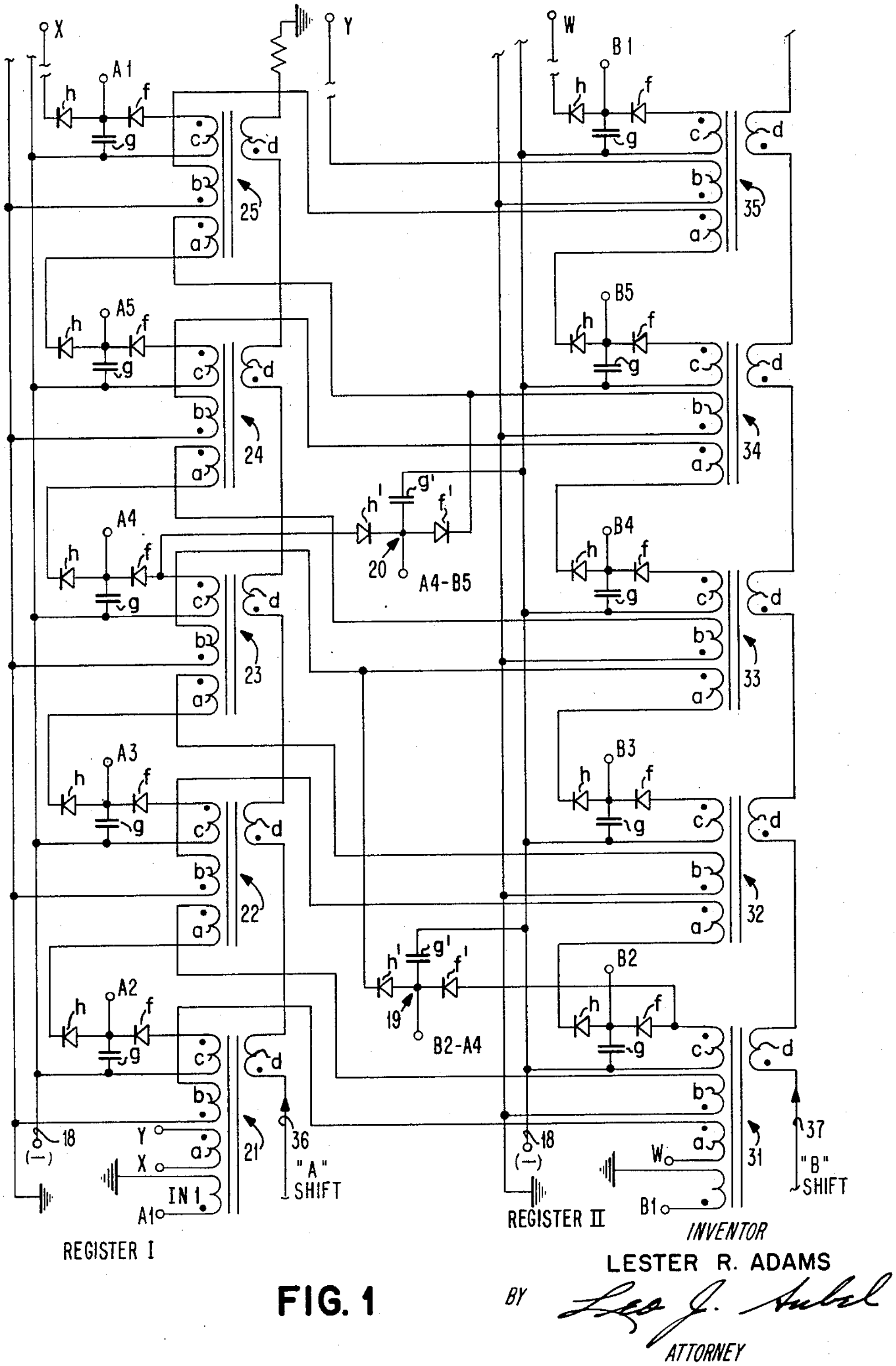
FIG. 1 is a schematic diagram of a timing ring circuit in accordance with the invention.

Referring to FIG. 1, there is shown a ring circuit comprising a first and a second register, namely, registers I and II. Each register comprises a plurality of bistable elements, preferably magnetic cores, arranged in series, i.e., the output of a core is utilized as an input to the succeeding core.

The magnetic cores utilized in the ring circuit of the invention have two stable states, that is, the cores have sufficient magnetic retentivity to remain in the stable magnetic state to which they are shifted. For purposes of explanation, assume that a first, initial, or reset stable state is indicated by a "0" and a second or set stable state is indicated by a "1." The various core stages are similar. As is known, the dots shown at each winding indicate the winding directions and the convention is that a positive current into the dotted end of a winding sets a core in state "1."

Each core in each of the registers includes an input winding *a*, a pair of output windings *b* and *c*, and a shift winding *d*. The output winding *c* of each of the cores is connected through a first diode *f*, and a second diode *h* to the input winding *a* of a succeeding core; the cathode of diode *f* is connected to the anode of diode *h*. One terminal of a capacitor *g* is connected to the junction of diodes *f* and *h*; the other terminal of capacitor *g* is connected to a negative reference line 18; for simplicity in depicting the circuit in the drawing, two negative reference lines 18 are shown in FIG. 1. One terminal of each of the output windings *b* of the cores in register I is connected to ground reference; the other terminal of each of windings *b* of the cores in register I is connected in series with respective windings *a* of the corresponding cores in register II note, for example, winding *b* of core 21 in register I connected in series to winding *a* in register II of core 31. The other terminal of each of windings *a* of the cores in register II is connected to the cathode of a preceding diode *h*. One terminal of each of windings *b* of the cores in register II is connected to ground reference; the other terminal of each of windings *b* of the cores in register II is connected to one terminal of winding *a* of a respectively succeeding core in register I; note, for example, winding *b* of core 31 in register II connected in series to winding *a* of core 22 in register I.

Shift line 36 is connected in series to the shift winding *d* of each of the cores in register I. Likewise, shift line 37 is connected in series to the winding *d* of each of the cores in register II. In operation, it will be understood that shift pulses are alternatively and continuously provided to shift lines 36 and 37; in FIG. 2, only the first shift pulse applied to each line is shown.

The A1, B1, W, X and Y terminals shown at the right-hand or top side of the circuit, as oriented in FIG. 1, are connected to the same numbered terminals on the left-hand or bottom side of the circuit to form a ring. It will be appreciated that the total number of stages employed in the timing ring is essentially unlimited, although only stages or cores 21–25 in register I and cores 31–35 in register II are shown.

Winding In1 coupled to core 21 of register I may receive the input signal to initiate the timing operation. The output signals from the timing ring are taken from the terminals at the junction of capacitor *g* and diodes *f* and *h* which terminals are lettered A1, A2 . . . A5 in register I, and which terminals are lettered B1, B2 . . . B5 in register II.

As will be explained in more detail hereinbelow, and as shown in FIG. 1, circuit connections can be made to various other points in the circuit to obtain different length pulses. For example, a circuit 19 including diodes *f'* and *h'*, a capacitor *g'*, and an output terminal labeled B2–A4 is connected as follows: Diode *f'* has its anode connected to one terminal of output winding *c* of core 31 in register II; the cathode of diode *f'* is connected to the anode of a second diode *h'* and the cathode of diode *h'* is connected to the junction of winding *b* of core 23 in register I and winding *a* of core 33 in register II. A capacitor *g'* has one terminal connected to the junction of diodes *f'* and *h'* and its other terminal connected to the negative reference potential line 18. In FIG. 1, another similar circuit 20 is connected between winding *c* of core 23 in register I and winding *b* of core 34 in register II; other similar circuits as desired may be connected to other points in the ring circuit to obtain pulses which are initiated at different time intervals and have a desired pulse length.

Figure 2:
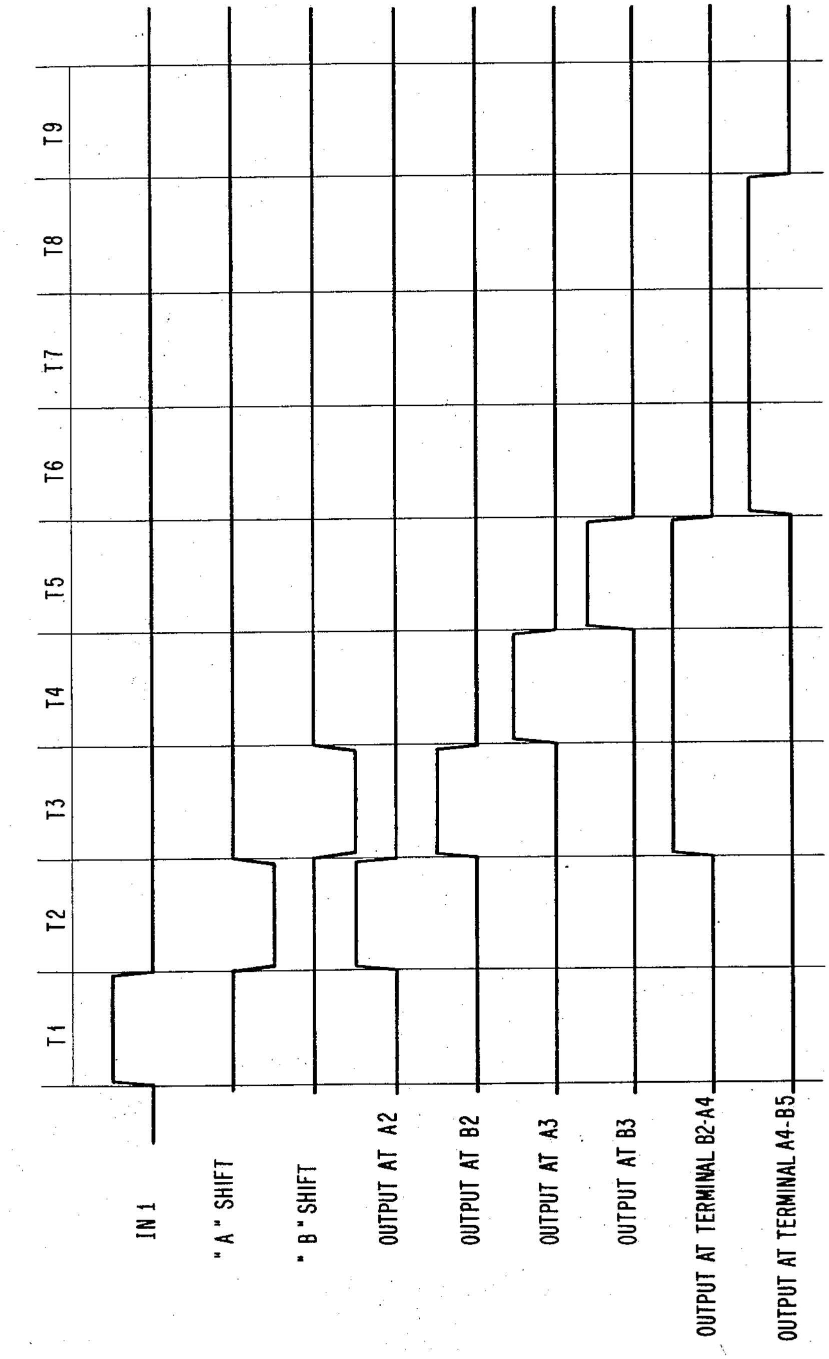
FIG. 2 shows wave forms useful in explaining the operation of the circuit of FIG. 1.

The operation of the circuit of FIG. 1 is as follows:

Assume, initially all the cores in the ring are reset, that is, at magnetic state "0." At time T1, see FIG. 2, winding In1 in register I is energized and core 21 set to "1." At time T2, a negative A shift pulse from suitable external circuitry, not shown, is applied to line 36 to reset core 21 to "0." When core 21 is set to "0," a voltage is induced across its ouput windings *b* and *c*; the voltage induced in winding *c* forward biases the associated diode *f* and charges the associated capacitor *g*. The voltage induced across winding *b* causes current flow through winding *a* of core 31 in register II and shifts core 31 to state "1."

Next, at time T3, a negative B shift pulse, also from suitable external circuitry, not shown, is applied to line 37 to reset core 31 to "0." Application of the B shift pulse produces three effects: first, it shifts core 31 of register II to "0"; then second, when core 31 is shifted or reset to "0," a voltage is induced in winding *c* of core 31 to forward bias associated diode *f* and charge capacitor *g* associated with core 31; and third, a voltage is induced in winding *b* of core 31. Winding *b* of core 31 tends to generate a current flow through its series circuit including winding *a* of core 22 and diode *h* associated with core 21. This causes diode *h* associated with core 21 to be forward biased and permits capacitor *g* associated with core 21 to discharge through winding *a* of core 22 in register I, and thus sets core 22 to "1." This completes the first cycle.

Note that at the termination of the first cycle, core 21 in register I is at state "0," core 31 in register II is at state "0," core 22 in register I is at state "1," and capacitor *g* associated with core 31 is charged.

Next a negative shift pulse is applied to line 36. The application of the A shift pulse does three things: first, it shifts core 22 of register I to "0"; then second, when core 22 is reset to "0," winding *c* of core 22 provides a voltage to forward bias its associated diode *f* and charges its associated capacitor *g*; and third, a voltage is induced in winding *b* of core 22. Winding *b* of core 22 tends to generate a current flow through its series circuit *a* of core 32, and diode *h* associated with core 31. This causes diode *h* associated with core 22 to be forward biased and permits capacitor *g* associated with core 31 to discharge through winding *a* of core 32 in register II, and thus sets core 32 to "1." This completes the second cycle.

Note that at the termination of the second cycle, cores 21 and 22 in register I are at state "0," core 31 in register II is at state "0," core 32 in register II is at state "1," and capacitor *g* associated with core 22 is charged.

The cycles of operation repeat down the line providing a series of output pulses at terminals A2, B2, A3, B3, A4 . . . as shown in FIG. 2.

The foregoing ring circuit provides pulses of from 0.5 to 40 microseconds' duration and can thus be used for applications in the megacycle range down to 20 or 30 kilocycles.

When it is desired to generate a pulse of longer duration as well as the basic timing pulses, a diode-capacitor circuit such as *f'*, *g'* and *h'* is connected at distinct points on the ring circuit. As noted hereinabove, the circuit including diode *f'*, capacitor *g'* and diode *h'* is connected from one terminal of winding *c* to the junction of winding *a* associated with core 33 and winding *b* associated with core 23. Thus, the voltage developed across winding *c*, when core 31 in register II shifts magnetic states, causes capacitor *g'* to charge. Capacitor *g'* maintains its charge until core 23 in register I is caused to shift from state "1" to state "0" and thus to forward bias diode *h'*, as discussed hereinabove with respect to diode *h* associated with core 21. The output obtained at terminal B2–A4 is a pulse of a relatively longer duration, as shown in FIG. 2.

The circuit connected to terminal A4–B5 operates similarly as above and provides an output a pulse of relatively long time duration at terminal A4–B5 at a later point in time than the pulse obtained at terminal B2–A4, as shown in FIG. 2.

It can be readily appreciated that the time at which a pulse output is initiated can be determined by the point on the circuit at which the foremost connection of a circuit such as *f'*, *g'* and *h'* is made. Also, the duration of the pulse can be determined by the point on the circuit at which the other or after connection of the circuit *f'*, *g'* and *h'* is made.

While the invention has been particularly shown and described with reference to a preferred embodiment thereof, it will be understood by those skilled in the art that various changes in form and details may be made therein without departing from the spirit and scope of the invention.

What is claimed is:

1. A circuit for developing timing pulses comprising first and second registers, each register including a plurality of magnetic core stages arranged in a ring circuit, each of said cores having first and second stable conditions, the stages in one register being interconnected to corresponding stages in the other register, each core having input windings for receiving input pulses causing the core to change from an initial condition to the other of its stable conditions, output windings on said cores, said output windings producing an output pulse when the core changes from its initial to its other stable condition, and shift windings for receiving shift pulses to shift a core to its initial condition, means connected to an output winding of each core for storing a pulse, gating means for connecting the stored pulse from said storing means to the windings of a selected succeeding core to thereby shift the stable condition of said succeeding core, each gating means also being connected to a winding of an associated core in the other register, each gating means in a register being activated to couple the stored pulse to a succeeding core when its associated core in the other register shifts stable conditions whereby output pulses are provided which are initiated at a determined time and are of a desired length.

2. A circuit for developing timing pulses comprising a pair of registers, each register including a plurality of magnetic cores, each of said cores having first and second magnetic stable conditions, first winding means wound on each core for shifting said cores to a first stable condition, second winding means wound on each core for shifting said cores from a first to a second stable condition, output winding means wound on each core for providing voltage pulses when the associated core shifts stable conditions, a capacitor associated with each core, a first unidirectional conducting device connecting an output winding means on a selected core in one register to charge the associated capacitor by the pulse produced when said selected core changes from its first to its second stable condition, a second unidirectional conducting device connected between each capacitor and a selected output winding means on a selected core in the other register, the associated second conducting device being forward biased when the selected core in said other register is shifted to its second stable condition to thereby cause the associated capacitor to discharge through said selected core whereby pulses of variable time duration may be provided dependent on the connections of said first and second conducting devices to their associated cores.

3. A circuit for developing timing pulses comprising first and second registers, each register including a plurality of magnetic cores arranged in a chain, each of said cores having first and second stable magnetic conditions, a plurality of windings on each core, a first of said windings on each core being energizable to shift the core to its first stable condition, a second of said windings on each core being energizable to shift the core to its second stable condition, a third one of said windings on each core being connected from one core in a register to the second winding on a corresponding core in the other register whereby the output pulse developed by said third winding when the associated core is shifted is connected to the second of said windings on the corresponding core in said other register to shift said corresponding core from its first to its second stable condition, capacitor means, a plurality of first unidirectional conducting means each connecting a fourth winding of a core in one register to an associated capacitor means for storing the output pulse developed in said fourth winding when the associated core is shifted from its second to its first stable condition, and a plurality of second unidirectional conducting means each connecting an associated capacitor means to the third winding of a succeeding core in said other register, one of said second unidirectional conducting means being forward biased when the associated succeeding core in said other register shifts from its second to its first stable condition to thereby discharge said associated capacitor through said third winding of said succeeding core whereby pulses of selected time duration may be provided by selectively connecting said first and second unidirectional conducting means to the windings of said cores in said registers.

4. A circuit as in claim 3 in which said unidirectional conducting means are diodes.

5. A system for providing timing pulses comprising first and second registers, each register including a plurality of saturable magnetic cores each having a first and second stable state, a core in one register having a corresponding core in the other register, each of said cores having a plurality of windings wound thereon, a first of said windings on each core being energizable to saturably magnetize the associated core to its first stable state, a second of said windings on each core being energizable to saturably magnetize the associated core to its second stable state, a plurality of first gating means, each gating means comprising a first and a second unidirectional conducting device connected in series, said first unidirectional conducting device of each gating means being connected to a third winding on an associated core, a capacitor means connected to each junction of said first and second unidirectional conducting devices for receiving and storing a voltage pulse, a second unidirectional conducting device connecting the associated capacitor means to said second winding on the succeeding core in a register for controllably gating a pulse from said capacitor means to said second winding of said succeeding core, a second winding of each core in one register being connected to said fourth winding of a preceding core in the other register, a second unidirectional conducting device being forward biased when the preceding core in said other register is shifted to a first stable state which enables the associated capacitor means to discharge through the second winding of the succeeding core in said one register whereby pulses are serially developed at the junction of said first and second unidirectional conducting devices, a plurality of second gating means each comprising first and second unidirectional conducting devices connected in series, second capacitor means connected to the junction of said first and second unidirectional conducting devices of said second gating means, said first unidirectional conducting device of a second gating means being connected to the third winding of a selected core in one register, and said second unidirectional conducting device of said second gating means being connected to the fourth winding of a selected core in the other register whereby pulses are provided at said junction of said first and second unilateral conducting devices of said second gating means, which pulses are initiated at a time and are of duration dependent on the selected cores to whose windings said first and second unidirectional conducting devices are connected.

References Cited in the file of this patent

UNITED STATES PATENTS

| | | |
|---|---|---|
| 2,654,080 | Browne | Sept. 29, 1953 |
| 2,730,695 | Ziffer | Jan. 10, 1956 |
| 2,832,951 | Browne | Apr. 29, 1958 |

FOREIGN PATENTS

| | | |
|---|---|---|
| 730,165 | Great Britain | May 18, 1955 |